United States Patent [19]

Minder et al.

[11] Patent Number: 5,303,892

[45] Date of Patent: Apr. 19, 1994

[54] PANEL FOR RECESSED MOUNTING OF A HOUSING

[75] Inventors: Urs Minder, Luzern; Peter Achermann, Ebikon, both of Switzerland

[73] Assignee: Inventio AG, Hergiswil, Switzerland

[21] Appl. No.: 68,058

[22] Filed: May 27, 1993

[30] Foreign Application Priority Data

May 27, 1992 [CH] Switzerland ........................ 01726/92

[51] Int. Cl.⁵ .............................................. A47F 5/08
[52] U.S. Cl. .................... 248/231.9; 248/27.1
[58] Field of Search ............... 248/27.1, 27.3, 231.9,
248/906; 362/368; 174/58, 52.1; 220/3.8, 3.9;
361/380, 427

[56] References Cited

U.S. PATENT DOCUMENTS

| | | | |
|---|---|---|---|
| 3,884,441 | 5/1975 | Barry | 220/3.5 X |
| 4,250,540 | 2/1981 | Kristofek | 248/27.1 X |
| 4,431,151 | 2/1984 | Schonasky | 248/27.1 |
| 4,444,369 | 4/1984 | Job | 248/27.1 |
| 4,555,080 | 11/1985 | Nara | 248/906 |
| 4,576,431 | 3/1986 | Thayer | 174/52.1 X |
| 4,790,501 | 12/1988 | Waters | 248/27.1 |
| 4,998,635 | 3/1991 | Wink | 220/3.9 X |
| 5,239,132 | 8/1993 | Bartow | 174/58 |

FOREIGN PATENT DOCUMENTS 2419900 10/1975 Fed. Rep. of Germany.
3513762 10/1985 Fed. Rep. of Germany.
9102425 6/1991 Fed. Rep. of Germany.
2082120 10/1991 France.

Primary Examiner—J. Franklin Foss
Attorney, Agent, or Firm—Howard & Howard

[57] ABSTRACT

A control panel is detachably connected by a retaining bracket to a housing which is mounted in an aperture formed in a support structure such as a wall. The positioning of the panel adjacent an outer surface of the support structure is independent of the depth of insertion of the housing in the aperture. The bracket is U-shaped with a generally vertical base portion and first and second legs extending horizontally from opposite ends of the base portion. Each leg has a hook formed at a free end thereof for detachably engaging a spring clip mounted on a rear surface of the panel. A pair of spring plates are attached to the base portion by fasteners and each plate has two pairs of spring tabs formed thereon for engaging a roughened surface on opposite side walls of the housing. After the insertion of the bracket into the housing, the fasteners can be loosened to permit positioning of the panel relative to the housing. Also, the bracket can be partially inserted into the housing while the panel is operational to permit work to be done on the support surface behind the panel. A groove in the rear surface of the panel and a recess formed in one of the hooks permits the associated spring clip to be disengaged from the hook and the panel to be detached from the bracket. The fasteners can be loosened to permit the bracket to be detached from the housing.

18 Claims, 4 Drawing Sheets

PANEL FOR RECESSED MOUNTING OF A HOUSING

BACKGROUND OF THE INVENTION

The present invention relates generally to an apparatus for recessed mounting of control element housings and, in particular, to an apparatus for.

A panel consisting of a housing, a cover plate and a mounting place with electronic and/or electromechanical elements is known from the utility model DE-GM-U1 G 91 02 425.0. The housing displays a base and a rim with a collar, on which a flange of the cover plate rests. Arresting strips and snap couplings enable a detachable connection between the housing and the cover plate. In the case of recessed mounting, the housing in a first variant is fastened at a wall plate, for example at a metal plate. With the aid of bracket-shaped arresting devices which are screwed firmly to the base of the housing and which bear on the rear surface of the metal plate, the housing is retained rigidly in the place between the rims of an opening which is provided in the metal plate and corresponds with the size of the housing. In a further variant for recessed mounting, a box-shaped central profile member is embedded flush into the surface material of a masonry wall. The housing is then inserted freely into the center profile member and can be made loose out of the wall.

A disadvantage of the known equipment lies in that additional equipments such as brackets, metal plates, screws and center profile members are necessary for the recessed mounting of the housing, which appreciably increases the effort for mounting operations, particularly in the case of large numbers, and makes a clean mounting of the cover plate more difficult.

SUMMARY OF THE INVENTION

The present invention concerns an apparatus for detachably connecting a control panel to a recessed housing mounted in an aperture formed in a support structure. A panel assembly includes a generally planar panel having a rear surface with an encircling rim extending rearwardly from the rear surface and an encircling flange extending from the rim in a plane of the panel for closing an aperture formed in a support surface. The panel assembly also includes a retaining bracket for detachably connecting the panel to an associated housing mounted in the aperture formed in the support structure, the retaining bracket having a generally vertically extending base portion, a first leg extending from an upper end of the base portion and having a pin threadably engaged therein and a second leg extending from a lower end of the base portion and having a pin threadably engaged therein, the pins engaging opposed interior surfaces of the housing, a pair of spring plates attached to the base portion for detachably engaging an interior surface of the housing, and a pair of spring clips for detachably connecting the first and second legs to the rim of the panel. The spring plates each include a plurality of outwardly extending spring tabs for engaging a region of the housing having a roughened surface and fastener means connect the spring plates to the base portion of the retaining bracket for permitting relative movement between the retaining bracket and the spring plates for positioning the panel relative to the housing and for removing the retaining bracket from the housing. A pair of grooves formed the flange adjacent the spring clips and each of the legs has a hook with a central recess formed at a free end thereof, each of the grooves being aligned with one of the recesses to permit force to be applied to the spring clips whereby the spring clips are disengaged from the hooks and the panel is detached from the retaining bracket.

The invention solves the problems and the disadvantages of the known equipment by providing a panel with control elements and reporting elements which panel can be mounted independently of the depth of insertion of the associated housing embedded in the support structure.

The advantages achieved by the invention also include the capability of compensating for the orientation of the housing and providing preliminary assembly position for the fully functional panel spaced from the support structure surface so that concluding manual operations can be carried out on that surface. Subsequently, the panel can be moved to a final assembly position in which the panel abuts the outer surface of the support structure.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
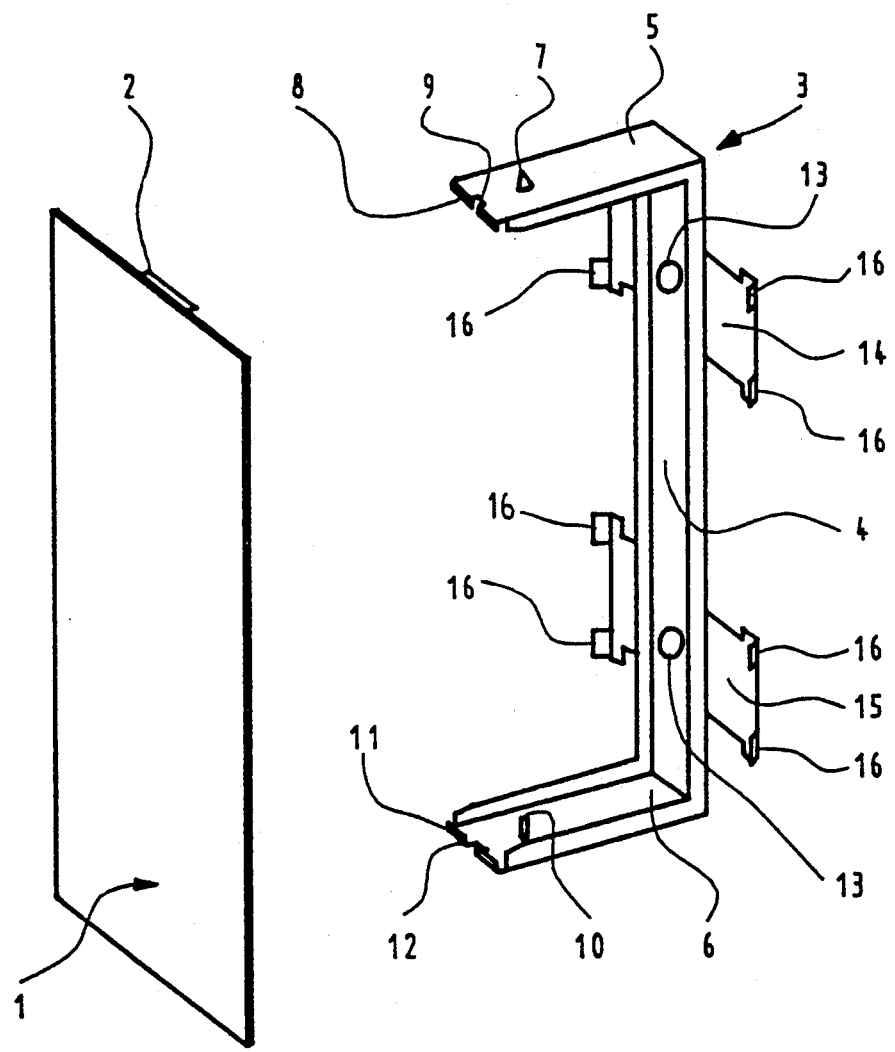
FIG. 1 is a perspective view of a panel and a retaining bracket according to the present invention before assembly.
Figure 2:
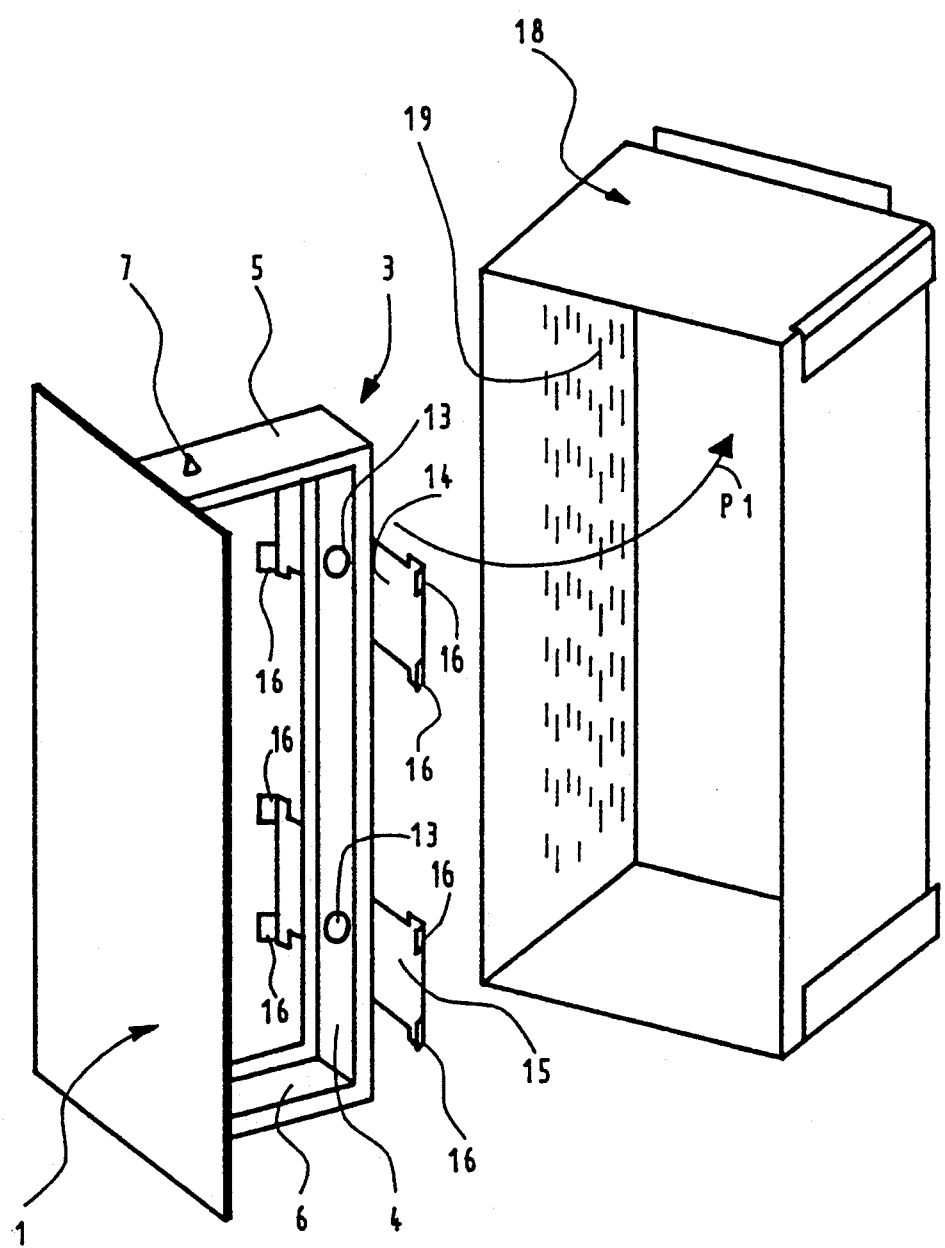
FIG. 2 is perspective view of the panel and the retaining bracket shown in the FIG. 1 connected together before insertion into an associated housing.

There is shown in the FIGS. 1 through 5, a control or command panel 1 which can be detachably connected to a generally U-shaped retaining bracket 3 by a first spring clip 2 adjacent an upper edge of the panel 1 and a similar second spring clip (not illustrated) adjacent a lower edge of the panel 1. Although not illustrated, control elements and reporting elements such as switches, keys, lamps, luminescent diodes, loud speakers and image display screens, the wiring of which is likewise not illustrated, can positioned in apertures (not shown) formed in the panel 1. Thus, the panel 1 can be used, for example, in building hallways adjacent elevator shaft doors.

The retaining bracket 3 includes a generally vertically extending base portion 4 having a first leg 5 extending perpendicularly from an upper end thereof and a second leg 6 extending perpendicularly from a lower end thereof generally parallel to the first leg 5. A first pin 7, for example a threaded pin with a socket head, extends through the leg 5 adjacent a free end thereof. A first hook 8 is formed as a downwardly extending flange extending across the free end of the first leg 5. The first hook 8 is interrupted centrally by a first recess 9 which extends into the leg 5. A second pin 10, similar to the pin 7, extends through the leg 6 adjacent a free end thereof. A second hook 11 is formed as an upwardly extending flange extending across the free end of the second leg 6 and is interrupted centrally by a second recess 12 which extends into the leg 6.

A first spring plate 14 and a second spring plate 15 are spaced apart vertically on a rearwardly facing surface of the base portion 4. Each of the plates 14 and 15 is attached to the base portion by a suitable fastener such as a screw 13. Each of the plates 14 and 15 can be made of metal and has a pair of opposed generally vertically extending side edges on which are formed a pair of generally forwardly extending spring tabs 16. As shown in the FIG. 5, a housing 18 is retained in a recess formed in a support structure 17 such as a wall or a panel made from, for example, wood, masonry, concrete or sheet metal. The plates 14 and 15 have a horizontal dimension approximately equal to the distance between the vertical side walls of the housing 18. During the insertion, illustrated by an arrow P1 in the FIG. 2, of the retaining bracket 3 into the housing 18, the spring tabs 16 engage a region 19 of an inner roughened surface on the vertical side walls of the housing 18 to retain the bracket 3 in the housing 18.

Figure 3:
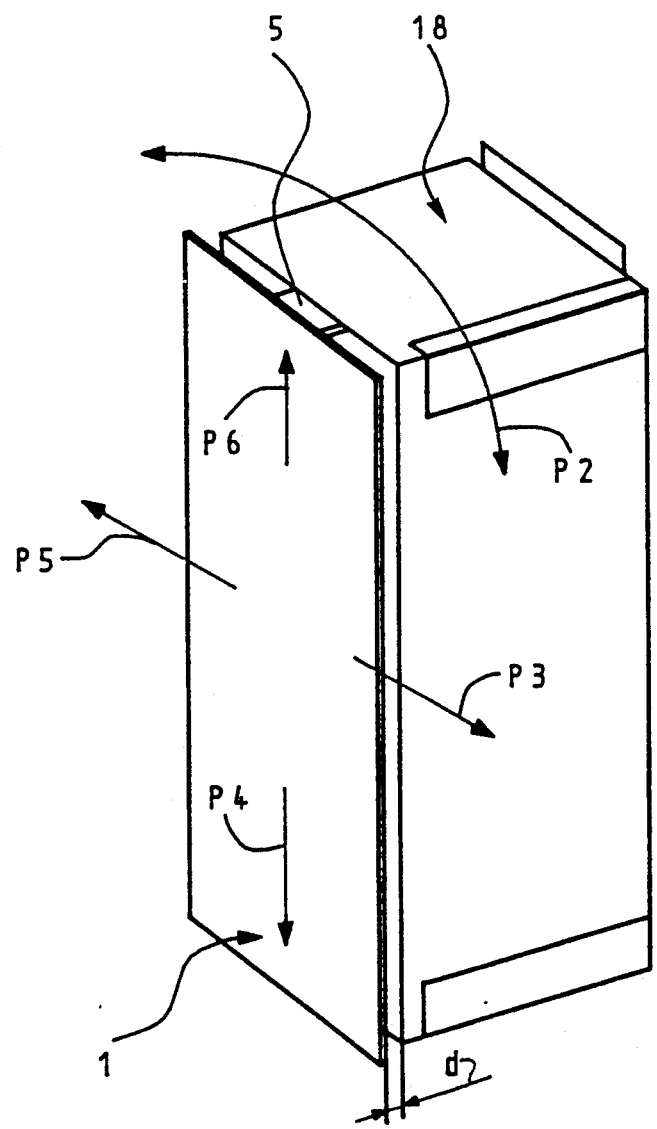
FIG. 3 is a perspective view of the panel, the bracket and the housing shown in the FIG. 2 in a partially assembled configuration.

In the FIG. 3, the panel 1 and the bracket 3 are shown partially assembled into the housing 18. For this purpose, the panel 1 is detachably connected to the retaining bracket 3 by the spring clips 2. The bracket 3 is inserted part way into the housing 18 with the tabs 16 on the spring plates 14 and 15 digging into the interior wall regions 19 of the housing 18 to leave a spacing d between a rear surface of the panel 1 and the front edge of the housing 18. When the front edge of the housing is recessed behind the front surface of the support structure 17, the spacing d will be equal to the distance required to position the rear surface of the panel 1 against the front surface of the support structure 17. Furthermore, since the panel 1 is fully capable of functioning in the partial assembled configuration shown in the FIG. 3, the spacing d first can be selected to permit the execution of manual operations on the support structure 17 such as cleaning, plastering and painting in the immediate surroundings of the housing opening. When these manual operations are complete, the panel 1 can be pushed toward the housing 18 against the resistance of the tabs 16 to a final assembled position.

A plurality of arrows P2, P3, P4, P5 and P6 shown in the FIG. 3 symbolize possible directions of adjustment of the retaining bracket 3 and the attached panel 1. The screws 13 pass through apertures (not shown) formed in the base portion 4 and threadably engage apertures (not shown) in the plates 14 and 15. In case the housing 18 is mounted in the support structure 17 in a position which would result in an undesired orientation of the panel 1, the panel can be detached from the bracket 3 as described below to permit access to the screws 13. The apertures formed in the base portion 4 are larger than the body and smaller than the head of the screws 13. Thus, the screws 13 can be loosened allowing the bracket to be moved in the direction of one or more of the arrows P2 through P6 and then tightened after the realignment is complete. Thereafter, the panel 1 is reattached to the retaining bracket 3. When the panel 1 and the bracket 3 have been pushed into the housing 18 as far as the flush setting of the panel 1 with the front surface of the support structure 17, the panel 1 can be removed and the pins 7 and 10 rotated to engage the upper and lower side walls respectively of the housing 18. The panel 1 is reattached to the retaining bracket 3 and the assembly is complete. In order to disassemble the panel 1 and the bracket 3 from the housing 18, the panel 1 is separated from the retaining bracket 3 and the screws 13 are loosened. The spring tongues 16 hooked into the tongue region can be loosened by applying a force onto one side of the spring plates 14 and 15.

Figure 4:
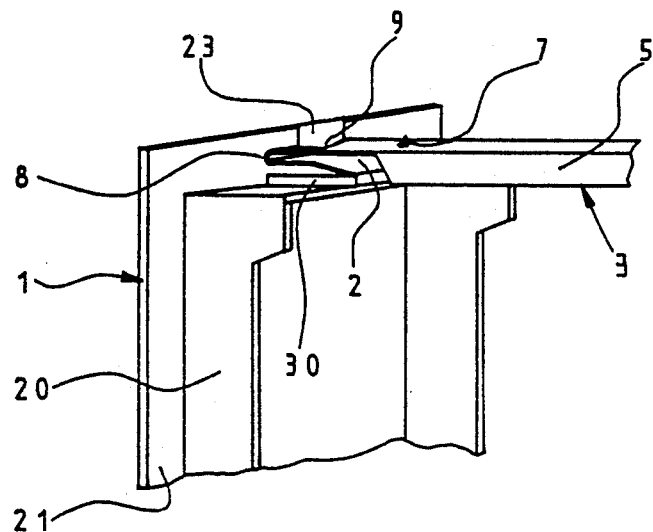
FIG. 4 is a fragmentary perspective view of the upper ends of the panel and the bracket shown in the FIGS. 2 and 3.
Figure 5:
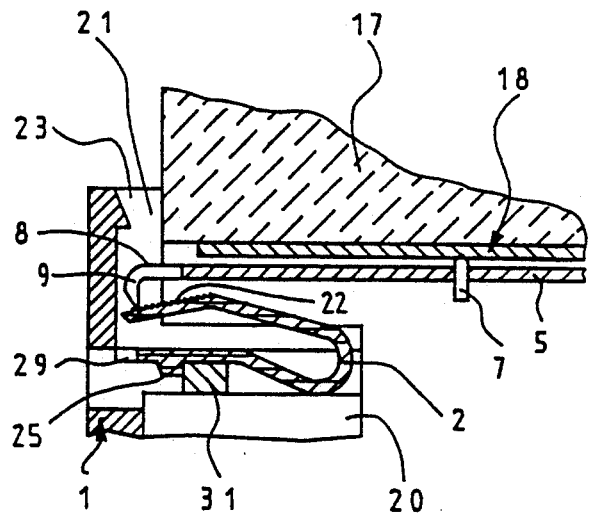
FIG. 5 is a fragmentary cross-sectional view of the panel, the bracket and the housing shown in the FIG. 3 mounted in a support structure.

As shown in the FIGS. 4 and 5, the panel 1 is provided with an encircling rim or wall 20 which extends rearwardly from the rear surface of the panel and an encircling flange 21 which extends outwardly from the rim 20 in the plane of the panel 1. The rim 20 is detachably connected to the hooks 8 and 11 by a pair of the spring clips 2. As shown in the FIG. 5, the hook 8 engages one free end of the spring clip 2 and the other free end is attached to the panel 1 as described below. When it is desired to detach the panel 1 from the bracket 3, an unlocking key (not shown) is guided through a groove 23 formed in an upper rear surface of the flange 21 and through the first recess 9 in the hook 8 to engage the spring clip 2 and bend downwardly the upper free end thereof until the spring clip 2 is separated from the hook 8. Although not shown, a similar groove is formed in a lower rear surface of the flange 23 for disengaging a spring clip engaged with the hook 11.

Figure 6:
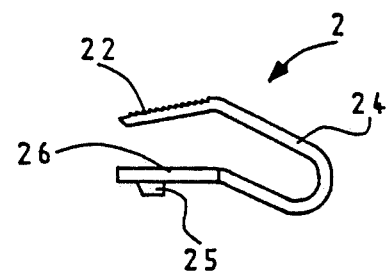
FIG. 6 is a side elevation view of the snap spring shown in the FIG. 5.
Figure 7:
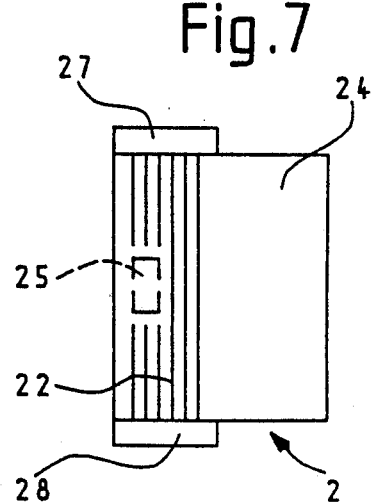
FIG. 7 is a top plan view of the snap spring shown in the FIG. 6.

As shown in the FIGS. 6 and 7, the spring clip 2 is generally U-shaped with a plurality of generally parallel ribs 22 formed on the upper free end thereof. The spring clip 2 body has a generally U-shaped central spring portion 24 which includes the upper free end having the ribs 22 and an opposite lower free end forming a guide portion 26. Extending downwardly from a center of the guide portion 26 is a dog 25 and a first sliding member 27 and a second sliding member 28 extend outwardly from opposite sides of the guide portion 26. During the mounting of the spring clip 2 on the rim 20, the first sliding member 27 slides into a generally horizontally extending first guide 29 formed on the rim 20 and the second sliding member 28 slides in a generally horizontally extending second guide 30 formed on the rim 20 until the dog 25 detents with a web 31 formed on and extending upwardly from the rim 20. Thus, the spring clip 2 is securely retained on the rim 20. Although not shown, a similar spring clip is mounted in the same manner on the bottom of the rim 20.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A panel assembly for attachment to a recessed housing mounted in an aperture formed in a surface of a support structure comprising:

a generally planar panel having a rear surface with an encircling rim extending rearwardly from said rear surface and an encircling flange extending from said rim in a plane of said panel for closing an aperture formed in a surface of a support structure;

a retaining bracket for detachably connecting said panel to an associated recessed housing mounted in the aperture formed in the surface of the support structure, said retaining bracket having at least one spring plate for detachably engaging an interior surface of the housing and for permitting selective positioning of said panel relative to the surface of the support structure; and means for detachably connecting said retaining bracket to said rim of said panel.

2. The panel assembly according to claim 1 wherein said spring plate includes a plurality of outwardly extending spring tabs for engaging a region of the interior surface of the housing having a roughened surface.

3. The panel assembly according to claim 2 wherein said retaining bracket is unitary and includes a generally vertically extending base portion to which said spring plate is attached, a first leg extending from an upper end of said base portion and having a pin threadably engaged therein and a second leg extending from a lower end of said base portion and having a pin threadably engaged therein, whereby said pins can be rotated into engagement with opposed walls of the housing when said retaining bracket is inserted into the housing.

4. The panel assembly according to claim 3 wherein said first leg has a hook formed at a free end thereof for engaging said means for detachably connecting said retaining bracket to said rim of said panel.

5. The panel assembly according to claim 4 wherein said means for detachably connecting includes a spring clip attached to said rim of said panel and engaged with said hook.

6. The panel assembly according to claim 5 wherein a pair of guides and a web are formed on said rim, said spring clip sliding into said guides and having a dog for detenting with said web to retain said spring clip on said panel, a groove formed said flange adjacent said spring clip and a central recess formed in said hook, said groove and said central recess permitting force to be applied to said spring clip whereby said spring clip is disengaged from said hook and said panel is detached from said retaining bracket.

7. The panel assembly according to claim 6 wherein said spring clip includes a generally U-shaped spring portion extending to a first free end having a plurality of ribs formed thereon for engaging said hook and a second free end on which said dog is formed.

8. The panel assembly according to claim 1 including fastener means connecting said spring plate to said retaining bracket, said fastener means permitting relative movement between said retaining bracket and said spring plate for positioning said panel relative to the housing and for removing said retaining bracket from the housing.

9. A panel assembly for attachment to a recessed housing mounted in an aperture formed in a surface of a support structure comprising:

a generally planar panel having a rear surface with an encircling rim extending rearwardly from said rear surface and an encircling flange extending from said rim in a plane of said panel for closing an aperture formed in a surface of a support structure;

a retaining bracket for detachably connecting said panel to an associated recessed housing mounted in the aperture formed in the surface of the support structure, said retaining bracket having a pair of spaced apart spring plates attached thereto by fastener means for detachably engaging an interior surface of the housing and for permitting selective positioning of said panel relative to the surface of the support structure; and means for detachably connecting said retaining bracket to said rim of said panel.

10. The panel assembly according to claim 9 wherein each of said spring plates includes a plurality of outwardly extending spring tabs for engaging a region of the interior surface of the housing having a roughened surface and said fastener means permits relative movement between said retaining bracket and said spring plates for positioning said panel relative to the housing and for removing said retaining bracket from the housing.

11. The panel assembly according to claim 9 wherein said retaining bracket is unitary and includes a generally vertically extending base portion to which said spring plates are attached, a first leg extending from an upper end of said base portion and having a pin threadably engaged therein and a second leg extending from a lower end of said base portion and having a pin threadably engaged therein, whereby said pins can be rotated into engagement with opposed walls of the housing when said retaining bracket is inserted into the housing.

12. The panel assembly according to claim 11 wherein said first and second legs each have a hook formed at a free end thereof and said means for detachably connecting includes a pair of spring clips attached to upper and lower ends of said rim of said panel and engaged with associated ones of said hooks.

13. The panel assembly according to claim 12 wherein a pair of guides and a web are formed on said rim at said upper and lower ends thereof, each said spring clip sliding into an associated pair of said guides and having a dog for detenting with an associated one of said webs to retain said spring clip on said panel, a pair of grooves formed said flange adjacent said spring clips and a recess formed in each of said hooks, each of said grooves being aligned with one of said recesses to permit force to be applied to said spring clips whereby said spring clips are disengaged from said hooks and said panel is detached from said retaining bracket.

14. The panel assembly according to claims 13 wherein each of said spring clips includes a generally U-shaped spring portion extending to a first free end having a plurality of ribs formed thereon for engaging one of said hooks and a second free end on which said dog is formed.

15. A panel assembly for attachment to a recessed housing mounted in an aperture formed in support surface comprising:

a generally planar panel having a rear surface with an encircling rim extending rearwardly from said rear surface and an encircling flange extending from said rim in a plane of said panel for closing an aperture formed in a support surface;

a retaining bracket for detachably connecting said panel to an associated housing mounted in the aperture formed in the support structure, said retaining bracket having a generally vertically extending base portion, a first leg extending from an upper end of said base portion and having a pin threadably engaged therein and a second leg extending from a lower end of said base portion and having a pin threadably engaged therein, said pins for engaging opposed interior surfaces of the housing, and a pair of spring plates attached to said base portion for detachably engaging an interior surface of the housing; and a pair of spring clips for detachably connecting said first and second legs to said rim of said panel.

16. The panel assembly according to claim 15 wherein said spring plates each includes a plurality of outwardly extending spring tabs for engaging a region of the housing having a roughened surface.

17. The panel assembly according to claim 16 includes fastener means connecting said spring plates to said base portion of said retaining bracket for permitting relative movement between said retaining bracket and said spring plates for positioning said panel relative to the housing and for removing said retaining bracket from the housing.

18. The panel assembly according to claim 15 includes a pair of grooves formed said flange adjacent said spring clips and wherein each of said legs has a hook with a central recess formed at a free end thereof, each of said grooves being aligned with one of said recesses to permit force to be applied to said spring clips whereby said spring clips are disengaged from said hooks and said panel is detached from said retaining bracket.

* * * * *